3,260,581
KINDLING COMPOSITION
Dominick A. Martin, Latrobe, Pa., assignor of fifteen percent to Paul W. Mahady
No Drawing. Filed Apr. 2, 1962, Ser. No. 184,551
7 Claims. (Cl. 44—41)

The present invention relates to fire kindling materials. More particularly, the invention relates to a free-flowing, particulate flammable composition capable of emitting intense heat for a suitable extended period during the kindling of cooking fires.

For many years, those skilled in the art have been engaged in the development of improved means for kindling fires. As the art has advanced coal, and particularly charcoal, has been transformed into many different forms, each of which has been directed to the improvement of its flammability characteristics. Coal, and charcoal have been powdered, compacted, briquetted, and otherwise altered so as to increase the ease and speed of the kindling. The starting materials have been impregnated with numerous flammable agents to impart quick burning characteristics thereto. The most common form of kindling compositions, and perhaps the most commonly accepted, have been coal, or charcoal, briquettes impregnated with coal oil, waxes, petroleum derivatives, and the like flammable compounds. All of these kindling materials have contributed to the art of starting cooking and heating fires but all of them have been characterized by inherent deficiencies. Actual kindling has heretofore necessitated the use of additional materials such as paper, oil, etc., for propagation of fires inasmuch as the kindling agents were insufficiently flammable to be ignited by the mere application of flame.

It is therefore a primary object of this invention to provide a greatly improved kindling composition.

Another object of the invention resides in the provision of a kindling composition which is free-flowing, easily ignited, and which provides intense heat for an extended period of time.

A further object of the invention is the provision of a particulate kindling composition which is characterized by its safety in storage and use.

Further objects of the invention will be apparent from the following detailed description thereof.

I have discovered that a particular mixture of liquid flammable agents, compounded within critical limits with particulate inorganic materials provides a kindling composition characterized, when ignited, by intense heat emission over a relatively extended period of time.

In a generic sense, I have found that a mixture of a flammable organic liquid, together with a particulate free-flowing inorganic material provides a greatly improved kindling composition. In the mixture, about 25% to about 60% by weight may consist of the flammable organic liquid. From about 30% to about 60% by weight of the total weight of the composition may comprise a microscopic inorganic silica-containing material. Also, it is usually desirable that the mixture contain from about 3% to about 10% by weight of an inorganic material having an average particle diameter of about 1/15 to about 1/500 inch, for example, sand. The two inorganic materials provide an excellent absorbent for the flammable liquid and, as well, retain and radiate heat during ignition periods. However, the kindling composition is free-flowing, non-caking, and is not easily ignited during storage even when in open containers such as open-mouth jars or metal containers. The free-flowing kindling agent may be sprinkled over a cooking or heating surface such as, for example, the fire box of an outdoor cooking device. The fuel material such as charcoal or the like may be placed thereover. Then, ignition of the kindling composition results in the emission of intense heat for a period of time sufficient to kindle the fuel and to provide a desirable heating and cooking period.

Specifically, I have discovered that an organic fluid mixture composed of about 96–98% of saturated hydrocarbons, of which about 40–50% comprises naphthenes and about 60–50% comprises paraffins is characterized by exceptionally desirable kindling properties when compounded as hereinafter described. There may also be present in the kindling composition about 2–3% of aromatic hydrocarbons and small amounts of about 1–2% or less of olefinic compounds. It is critical that the paraffinic materials be so controlled that the flash point of the kindling composition measured by ASTM–D–56 method lies within the range of about 100° F. to about 140° F. This critical feature of the invention will be amplified in more particularity hereinafter. The particular organic flammable liquid is available commercially in one form as Stoddard Solvent manufactured by the Naphtha Solvents Company, Inc. The material has an aniline point, measured by ASTM–D–611 method of about 147.0 to about 149.0.

The organic flammable liquid is combined with the forementioned particulate inorganic material so as to provide a saturated, free-flowing powder in the proportions given above. The inorganic powder includes such materials as inverted micro-crystalline silica of which Fuller's earth is a typical material. This finely divided inorganic material is characterized by its outstanding absorbency. About 3% to about 10% of the inorganic material may comprise loose grains of sand having an average particle diameter of about 1/15 to about 1/500 inch. This relatively coarser material insures that the final kindling composition remains free-flowing and non-caking during storage and in use. Where desired, of course, this coarser material may be eliminated although its presence is desirable in most instances.

As stated hereinbefore, the novel kindling composition of the invention is characterized by relative incombustibility when exposed to the atmosphere in open-mouth jars and open metallic containers. This critical feature of the invention is derived from the unexpected discovery that the inclusion, in the kindling composition, of relatively small to appreciable amounts of water imparts to the kindling composition outstanding handling and kindling properties. The amounts of water which may be satisfactorily incorporated in the kindling composition lie within the range of about 2% to about 30%, by weight, based on the total weight of the kindling composition. The preferred raio of inorganic solids to liquid materials is about 20% to about 60% of liquids to about 80% to 40% of inorganic solids.

For example, in preparing the kindling compositions of the invention, where there is employed, as liquid, 98% of the preferred organic solvent agent plus the above-described inorganic matter, the flash point has been found to be about 109° F. and the ignition point about 113° F. On the other hand, where 50% of the total liquid weight of the kindling composition is water, the flash point of the composition is about 126° F. and the ignition temperature is 131° F. Thus, it will be appreciated that the inclusion of water in the novel kindling composition is of outstanding importance inasmuch as the elevation of flash point and ignition temperatures insures that the composition is entirely safe from hazard or unintentional ignition during storage and use.

In preparing the kindling compositions of the invention, there may also be included small amounts, of the order of about 1/4% to about 1% by weight of composition, of dyestuffs for coloring purposes. Additionally, there may be included in the compositions deodorizers in amounts of up to about 0.75% by weight of the kindling composition. Both of these ingredients, however, contribute solely to selling appeal and are not considered part of the invention per se.

In order that the invention will be fully understood, the following specific examples are presented. It is to be understood, however, that the examples are given for the purpose of illustration only, the invention being limited solely by the scope of the appended claims.

In the examples, all of the ingredients are given in parts by weight.

Example I

In a preferred composition, 40 parts of an organic flammable material are thoroughly mixed with 50 parts of Fuller's earth and 5 parts of sand having an average particle diameter of about $1/15$–$1/600$ inch. The organic material has a flash point of 106° F. and comprises about 96.3% of saturated hydrocarbons of which 46.1% are naphthenic compounds and 50.2% are paraffinic compounds, the remainder being aromatic and olefinic materials. To the compounded mixture are added 41 parts of water. One part of coloring and deodorizing matter are included. The thoroughly blended kindling material is non-ignitable when stored in open-mouth jars or metal containers, but emits intense heat over an extended period of time when ignited in open atmosphere. The kindling composition is very satisfactory in igniting charcoal and is characterized by exceptional shelf life even when stored in open containers.

Example II 28 parts of organic flammable material, 10 parts of sand, 60 parts of fuller's earth, and 2 parts of water are thoroughly blended. The mixture functions very well in igniting charcoal.

Example III 25 parts of organic flammable material, 10 parts of sand, 60 parts of fuller's earth, and 5 parts of water are blended together. The mixture emits intense heat upon ignition and is free-flowing during storage for extended periods of time.

Example IV 30 parts of organic flammable liquid, 35 parts of fuller's earth, 5 parts of sand, and 30 parts of water are thoroughly mixed. The mixture is free-flowing over many months, and emits intense heat upon ignition.

It will be apparent from the foregoing description and illustrative examples that the present invention presents a decided advance in the art of kindling compositions. The compositions are easily compounded, inexpensive, and desirably utilizable in the form of free-flowing, non-caking powders. They are not dangerous during storage or use but, at the same time, provide kindling compositions which may be easily sprinkled over the area required and provide intense heat during an extended period of time.

The invention is not to be construed as limited to the illustrations given, inasmuch as modifications will become apparent to those skilled in the art, and is to be limited only by the scope of the appended claims.

I claim:

1. A kindling composition comprising from about 30% to about 60% by weight of a particulated absorbent material consisting essentially of inverted micro-crystalline silica, about 3% to about 10% of a particulated inert inorganic material having an average diameter of about $1/15$–$1/600$ inch, from about 25% to about 60%, by weight, of a hydrocarbon liquid, and about 2% to about 30% of water.

2. A free-flowing kindling composition wherein for each 100 parts, by weight thereof there are from about 30 parts to about 60 parts of a particulated absorbent material consisting essentially of inverted micro-crystalline silica, from about 3 to about 10 parts of an inert inorganic material having an average diameter of about $1/15$ to about $1/600$ inch, from about 25 to about 60 parts of a hydrocarbon liquid, and from about 2 to about 30 parts of water.

3. A free-flowing kindling composition wherein for each 100 parts by weight there are present about 50 parts of a particulated absorbent inorganic material consisting essentially of micro-crystalline silica, about 5 parts of an inert inorganic material having an average diameter of about $1/15$ to about $1/600$ inch, about 40 parts of a hydrocarbon liquid, and about 4 parts of water.

4. A kindling composition as in claim 3 wherein said absorbent inorganic material is fuller's earth.

5. A kindling composition as in claim 4 and wherein said inert inorganic material having an average diameter of about $1/15$ to about $1/600$ inch comprises sand.

6. A free-flowing, non-caking kindling composition wherein for each 100 parts by weight thereof there are present from about 30 parts to about 60 parts of a particulated micro-crystalline silica, from about 3 parts to about 10 parts of an inert inorganic material having an average diameter of about $1/15$ to about $1/600$ inch, from about 2 parts to about 30 parts of water, and from about 25 parts to about 60 parts of a flammable organic liquid, said organic liquid comprising about 96–98% of saturated hydrocarbons of which about 40–50% comprises naphthenes and about 60–50% comprises paraffins.

7. A free-flowing, non-caking kindling composition wherein for each 100 parts by weight thereof there are present from about 30 parts to about 60 parts of particulated absorbent fuller's earth, from about 3 parts to about 10 parts of an inert inorganic material having an average diameter of about $1/15$ to about $1/600$ inch, from about 25 parts to about 60 parts of a hydrocarbon liquid, and from about 4 parts to about 30 parts of water, said kindling composition having a flash point of about 126° F. and an ignition point of about 131° F.

References Cited by the Examiner

UNITED STATES PATENTS

| | | | |
|---|---|---|---|
| 323,058 | 7/1885 | Mitchell | 44—38 |
| 418,316 | 12/1889 | Gathemann | 44—38 |
| 1,707,019 | 3/1929 | Kirshbraun | 44—51 |
| 1,926,071 | 9/1933 | Vance | 44—51 |
| 2,090,393 | 8/1937 | Roberts et al. | 44—51 |

DANIEL E. WYMAN, *Primary Examiner.*

R. V. EDMONDS, C. F. DEES, *Assistant Examiners.*